United States Patent [19]

Scott

[11] Patent Number: 4,812,150
[45] Date of Patent: Mar. 14, 1989

[54] METALLIC-GLASS COATED OPTICAL FIBRES

[75] Inventor: Michael G. Scott, Littlebury, Great Britain

[73] Assignee: Standard Telephones and Cables, PLC, London, England

[21] Appl. No.: 17,579

[22] Filed: Feb. 24, 1987

Related U.S. Application Data

[63] Continuation of Ser. No. 675,560, Nov. 28, 1984, abandoned.

[30] Foreign Application Priority Data

Dec. 6, 1983 [GB] United Kingdom ............... 8332545

[51] Int. Cl.⁴ .................................. C03B 37/014
[52] U.S. Cl. ........................ 65/3.11; 65/3.2; 65/3.3; 427/163
[58] Field of Search ............ 65/3.1, 3.11, 3.2, 3.3, 65/12, 30.1, 32, 33, 59.1, 60.4, 154; 350/320; 427/163

[56] References Cited

U.S. PATENT DOCUMENTS

| | | | |
|---|---|---|---|
| 2,880,552 | 4/1959 | Whitehurst | 65/3.3 |
| 4,173,393 | 11/1979 | Maurer | 65/3.3 |
| 4,227,907 | 10/1980 | Merritt | 65/2 |
| 4,321,073 | 3/1982 | Blair | 65/3.31 |
| 4,388,093 | 6/1943 | Kimura et al. | 65/3.11 |
| 4,407,561 | 10/1983 | Wysocki | 65/3.3 |
| 4,411,678 | 10/1983 | Arai | 65/3.12 |
| 4,418,984 | 12/1983 | Wysocki et al. | 65/3.3 |
| 4,530,750 | 7/1985 | Aisenberg et al. | 65/3.12 |

FOREIGN PATENT DOCUMENTS

| | | | |
|---|---|---|---|
| 57-188429 | 11/1982 | Japan | 65/3.3 |
| 57-191248 | 11/1982 | Japan . | |
| 57-191246 | 11/1982 | Japan . | |
| 58-26047 | 2/1983 | Japan | 65/3.12 |
| 58-168003 | 10/1983 | Japan | 65/3.3 |
| 1292174 | 10/1972 | United Kingdom . | |
| 1482044 | 8/1977 | United Kingdom . | |
| 1499602 | 2/1978 | United Kingdom . | |
| 2052566 | 1/1981 | United Kingdom . | |
| 1583835 | 2/1981 | United Kingdom . | |
| 2086942 | 5/1982 | United Kingdom . | |

OTHER PUBLICATIONS

Butterworths et al., "Amorphous Metallic Alloys" edited by F. E. Luborsky, 1983, pp. 51–57, 12–31.

Primary Examiner—Kenneth M. Schor
Attorney, Agent, or Firm—Dennis P. Clarke

[57] ABSTRACT

An optical fibre is provided with a coating by coating the fibre (1) with a coating material (4) on-line with the fibre drawing process (2) and employing a laser beam (6) to locally heat the coating material whereby to change its physical or chemical properties. Metallic glass coated fibres, useful for hermeticity and sensor applications, can thus be achieved in multikilometer lengths by fusing metallic glass forming alloy coatings to a fibre. Alternatively, polymer coatings may be cured by laser beam local heating.

7 Claims, 1 Drawing Sheet

U.S. Patent    Mar. 14, 1989    4,812,150
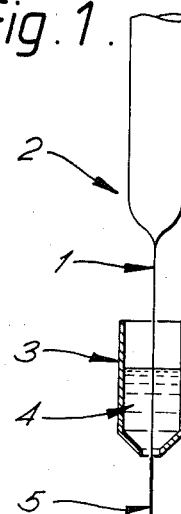
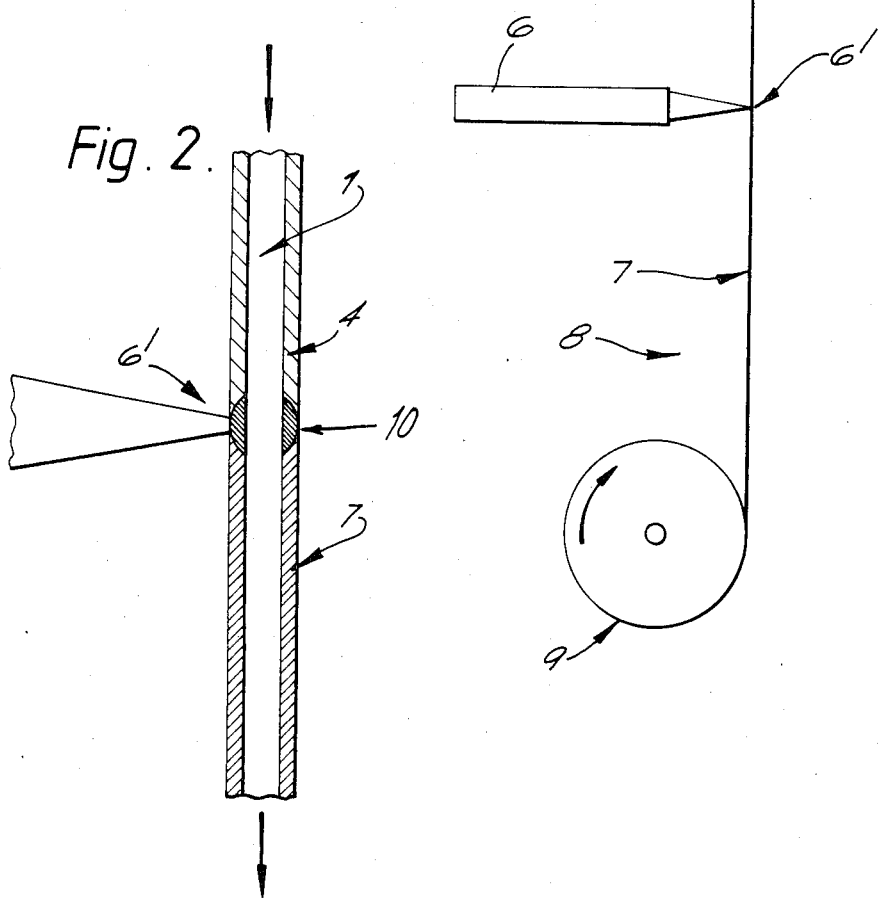

METALLIC-GLASS COATED OPTICAL FIBRES

This is a continuation of application Ser. No. 675,560, filed Nov. 28, 1984 now abandoned.

BACKGROUND OF THE INVENTION

This invention relates to optical fibres and, in particular, to methods of providing them with coatings.

SUMMARY OF THE INVENTION

According to the present invention there is provided a method of providing an optical fibre with a coating including the step of employing a laser beam to cause local heating of the coating material on an optical fibre whereby to induce a physical or chemical change therein.

BRIEF DESCRIPTION OF THE DRAWINGS

Embodiments of the invention will now be described with reference to the accompanying drawings, in which:

FIG. 1 shows the layout of an on-line coating system for the performance of a coating method according to the present invention, and FIG. 2 illustrates in more detail and on a larger scale the laser function region of FIG. 1.

DESCRIPTION OF THE PREFERRED EMBODIMENTS

It has previously been proposed to improve the fatigue performance of optical fibres by use of coatings which inhibit flaw growth by providing resistance to attack by moisture. Metallic glass coatings have been suggested for this hermeticity purpose. Optical fibres with metallic glass coatings are also useful for sensor applications. For that purpose short fibre lengths have been coated with metallic glass by sputtering. Fibre optic sensors are also known which are produced by glueing fibre to metallic glass strips.

The methods proposed by the present invention may be carried out on-line with the fibre drawing process and thus permit on-line coating of multi-kilometer lengths to be achieved.

Referring firstly to FIG. 1, a newly drawn fibre 1, which may be drawn from a conventional preform or crucible indicated generally at 2, is passed through a crucible 3 containing a suitable molten metallic-glass forming alloy 4, for example Fe-Ni-B or Ni-Zr, and exits through an orifice at the bottom of the crucible 3 as an alloy coated fibre 5. The coated fibre 5 is passed through the focus $6^1$ of a laser beam output from a laser 6 which serves to melt the metal layer locally. The molten alloy cools rapidly and therefore produces a metallic-glass coated fibre at 7, the coating being fused to the fibre. A polymer coating may be applied in a conventional manner at 8 if desired. The coated fibre is taken up on a spool 9.

The laser fusion region is indicated more clearly in FIG. 2. The fibre 1 coated with alloy 4, which is expected to be crystalline, is passed in the direction of the arrows through the laser focus $6^1$ resulting in a molten zone 10 which subsequently cools to produce the metallic glass coated fibre 7.

Whereas the invention has so far been described with reference to metallic glass coatings on optical fibres, the laser fusion coating process is applicable to the provision of other coatings applied at speed to optical fibres for example, ceramics or polymers, in which the fibre is coated by passing it through a bath of a coating material and the coating material is fused to the glass of the fibre as a result of rapid passage through the focus of the laser beam. As an alternative to providing the metal or other coating to the fibre by dip coating, that is where the fibre is passed through a crucible of the molten metal or liquid coating material, the coating may be applied to the fibre by other means, for example a vapour phase technique may be employed.

Whereas in the above described example the laser serves to fuse the coating to the fibre, the effect of the laser is basically to cause local heating which induces a physical or chemical change in the coating, such as glassifying a metal coating or inducing a phase transformation in the coating material, for example curing a polymer.

We claim:

1. A method of manufacturing a metallic glass coated optical fiber comprising the steps of applying a single layer of a metallic-glass-forming alloy to an optical fiber, the applied single layer being crystalline in form, and subsequently employing a laser beam to cause local melting of the single layer of metallic-glass-forming alloy, which local melting is carried out with the fiber moving rapidly through the laser beam so that the locally melted single layer cools sufficiently rapidly to produce a metallic glass coating on the fiber, the metallic glass coating being non-crystalline.

2. A method as claimed in claim 1, wherein the single layer of the metallic-glass-forming alloy is applied to the optical fiber by passing the optical fiber through a crucible of molten metallic-glass-forming alloy.

3. A method as claimed in claim 1 wherein said application of said single layer of metallic-glass-forming alloy and said local heating of said single layer of metallic-glass-forming alloy are carried out on-line with drawing of the optical fiber.

4. A method as claimed in claim 1 including the additional step of coating the metallic glass coated optical fiber with a polymeric coating material subsequently to the formation of the metallic glass by said laser beam heating step and the subsequent cooling.

5. A method as claimed in claim 1 wherein the metallic-glass-forming alloy is Fe-Ni-B.

6. A method as claimed in claim 1 wherein the metallic-glass-forming alloy is Ni-Zr.

7. A method of manufacturing a metallic glass coated optical fiber comprising the steps of applying a single layer of an alloy to an optical fiber, the alloy being a metallic glass precursor, the applied single layer of alloy being crystalline, and subsequently employing a laser beam to cause local melting of the applied single layer of alloy, which local melting is carried out with the fiber moving rapidly through the laser beam so that the locally melted single layer of alloy cools sufficiently rapidly to produce a metallic glass coating on the fiber.

* * * * *